(12) United States Patent
Koseki et al.

(10) Patent No.: US 8,137,819 B2
(45) Date of Patent: Mar. 20, 2012

(54) MULTILAYER STEEL AND METHOD FOR PRODUCING MULTILAYER STEEL

(75) Inventors: Toshihiko Koseki, Tokyo (JP); Toshio Suzuki, Tokyo (JP); Toyonobu Yoshida, Tokyo (JP); Junya Inoue, Tokyo (JP); Mitsuyuki Tanaka, Tokyo (JP)

(73) Assignee: The University of Tokyo, Tokyo (JP)

(*) Notice: Subject to any disclaimer, the term of this patent is extended or adjusted under 35 U.S.C. 154(b) by 450 days.

(21) Appl. No.: 12/374,997

(22) PCT Filed: Jul. 26, 2007

(86) PCT No.: PCT/JP2007/064694
§ 371 (c)(1),
(2), (4) Date: Jan. 23, 2009

(87) PCT Pub. No.: WO2008/013233
PCT Pub. Date: Jan. 31, 2008

(65) Prior Publication Data
US 2010/0003540 A1    Jan. 7, 2010

(30) Foreign Application Priority Data
Jul. 27, 2006    (JP) .................................. 2006-205283

(51) Int. Cl.
B32B 15/18    (2006.01)
B23K 20/04    (2006.01)
C21D 9/46    (2006.01)
B21B 47/00    (2006.01)

(52) U.S. Cl. ........ 428/635; 428/683; 428/685; 148/534; 228/190; 228/235.3

(58) Field of Classification Search .................. None
See application file for complete search history.

(56) References Cited

U.S. PATENT DOCUMENTS

| | | | | |
|---|---|---|---|---|
| 1,340,149 A * | 5/1920 | Browne | ........................ | 428/606 |
| 2,474,682 A * | 6/1949 | Liebowitz | .................... | 428/610 |
| 2,562,467 A * | 7/1951 | Kinnear, Jr. | .................. | 428/683 |
| 2,753,623 A * | 7/1956 | Boessenkool et al. | ........ | 228/205 |
| 3,862,484 A * | 1/1975 | Chivinsky | .................... | 228/190 |
| 3,943,011 A * | 3/1976 | Dromsky | ..................... | 428/683 |
| 4,178,417 A * | 12/1979 | Oda et al. | ..................... | 428/679 |
| 4,399,611 A * | 8/1983 | Maringer | ........................ | 30/350 |
| 4,645,720 A * | 2/1987 | Pircher et al. | ................. | 428/683 |
| 4,736,887 A | 4/1988 | Inaba | | |
| 4,881,430 A * | 11/1989 | Hubbard | ...................... | 76/104.1 |
| 4,973,524 A * | 11/1990 | Huebner et al. | .............. | 428/683 |
| 5,185,044 A * | 2/1993 | Verhoeven et al. | ........... | 148/546 |
| 5,213,905 A * | 5/1993 | Leger et al. | ................... | 428/683 |
| 5,997,665 A * | 12/1999 | Brisson et al. | ................ | 148/529 |

(Continued)

FOREIGN PATENT DOCUMENTS

JP    61273277    12/1986

(Continued)

*Primary Examiner* — John J Zimmerman
(74) *Attorney, Agent, or Firm* — McDermott Will & Emery LLP (57) ABSTRACT

Disclosed is a multilayered steel composite which compatibly achieves properties such as strength and ductility that are incompatible in conventional steels and is excellent in strength, ductility, weldability, toughness and fatigue strength. Also, disclosed is a method for producing the multilayered steel which is produced by rolling with least two kinds of steels having different chemical compositions and microstructure or different mechanical properties, in combination.

15 Claims, 6 Drawing Sheets

U.S. PATENT DOCUMENTS

| | | | | |
|---|---|---|---|---|
| 6,105,261 | A * | 8/2000 | Ecer | 30/346.54 |
| 2002/0112350 | A1* | 8/2002 | Rabinkin | 29/890.03 |
| 2008/0251389 | A1* | 10/2008 | Kingston | 205/191 |

FOREIGN PATENT DOCUMENTS

| | | | |
|---|---|---|---|
| JP | 62016892 | | 1/1987 |
| JP | 62110880 | | 5/1987 |
| JP | 02030712 | | 2/1990 |
| JP | 04232737 | | 8/1992 |
| JP | 4-371526 | * | 12/1992 |
| JP | 5-1328 | * | 1/1993 |
| JP | 5-5129 | * | 1/1993 |
| JP | 5-5190 | * | 1/1993 |
| JP | 05005190 | | 1/1993 |
| JP | 6-220582 | * | 8/1994 |
| JP | 2001-277271 | | 10/2001 |
| JP | 2005298960 | | 10/2005 |
| JP | 2005-306039 | | 11/2005 |
| WO | WO-2004073900 | | 9/2004 |

* cited by examiner

TUNNEL CRACK

MULTILAYER STEEL AND METHOD FOR PRODUCING MULTILAYER STEEL

CROSS-REFERENCE TO PRIOR RELATED APPLICATIONS

This is the U.S. national phase application under 35 U.S.C §371 of International Patent Application No. PCT/JP2007/064694, filed Jul. 26, 2007, which claims the benefit of Japanese Application No. 2006-205283, filed Jul. 27, 2006. The International Application was published in Japanese on Jan. 31, 2008 as International Publication No. WO 2008/013233 under PCT Article 21(2). The contents of the afore-mentioned applications are incorporated herein by reference in their entireties.

TECHNICAL FIELD

The present invention relates to a multilayered steel in which two properties of a steel being incompatible with each other such as high strength and high ductility can be made compatible with each other and to a method for producing the same.

BACKGROUND OF THE INVENTION

In a mobile unit such as an automobile, achievement of lightweight is required from the viewpoint of performance and/or environmental response. Therefore, two main approaches have been adopted so far to obtain structural materials that can meet such demands. One approach is to make an iron and steel material thin by raising strength thereof and another approach is to use an alloy having a small specific gravity instead of the iron and steel material.

However, when an iron and steel material is made higher in strength and smaller in thickness, problems arise such as degradation of ductility and fatigue strength and hydrogen embrittlement in association with the material being made stronger and thinner.

Moreover, in the case where the alloy of Al or Mg having a low specific weight is used instead of the iron and steel material, due to low strength and stiffness thereof, it is necessary to increase its plate thickness or to make its cross sectional shape complicated in order to obtain the strength and stiffness being equal to that of the iron and steel material. Consequently, another problem arises that it becomes impossible not only to achieve a lightweight effect that can be normally expected from differences in specific gravity but also to avoid the problems of degradation in press-formability, embrittlement caused by dissimilar materials joining, corrosion, and the like.

Therefore, the advent of an iron and steel material is strongly expected which can achieve structural lightweight thereof and can simultaneously have high strength and, further, can solve the problem of the degradation in ductility, toughness, formability, fatigue strength, corrosion resistance, resistance to hydrogen embrittlement, and the like coming with the lightweight and high strength.

However, since strength and ductility in particular are incompatible with each other, it is difficult for the conventional iron and steel materials to achieve the compatibility.

Figure 1:
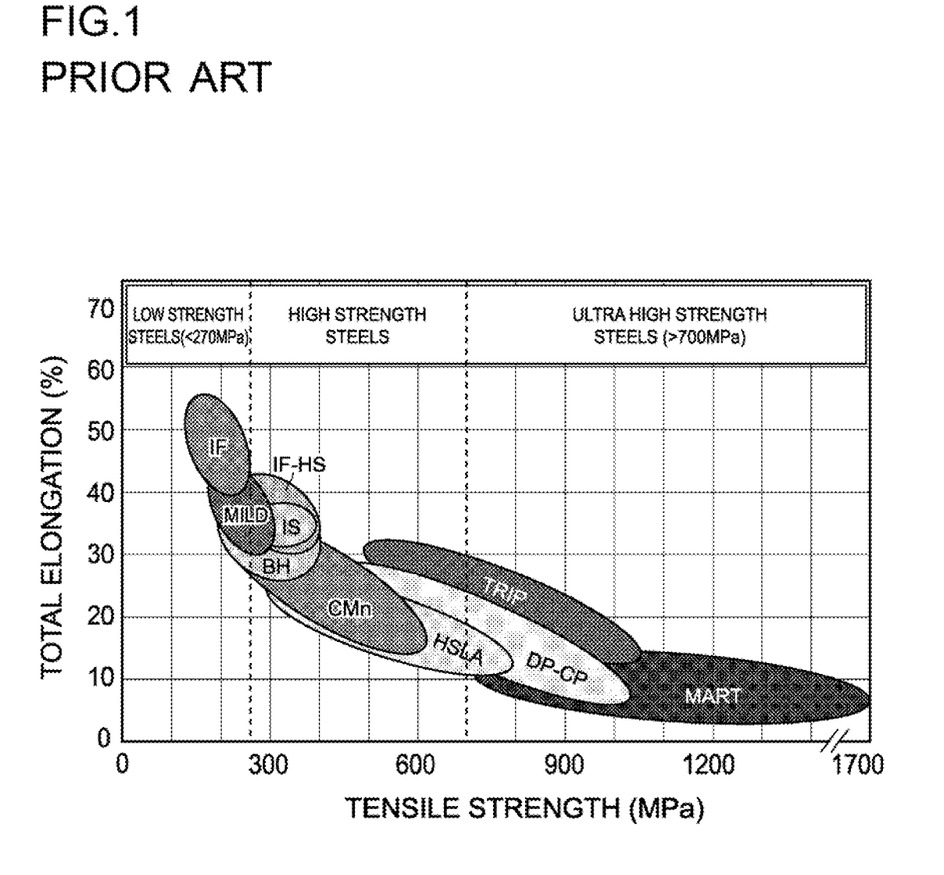
FIG. 1 is a graph showing a correlation between strength and ductility of conventional steels.

FIG. 1 is a graph showing a correlation between strength and ductility of conventional steels. In FIG. 1, strength is represented by tensile strength and ductility is represented by elongation. The steel shown as MART (Martensite) in FIG. 1 is martensitic steel having ultra-high strength but extremely low ductility. It can be understood from FIG. 1 that, in any of the steels, the higher the strength becomes, the lower the ductility becomes.

Conventionally, as one of means to improve properties of a material, the multilayering of the material by using different dissimilar materials each having required properties is being studied.

The material obtained by multilayering steels or other materials includes a clad plate, laminated plate, composite material, or the like.

The clad plate is a steel plate or metal plate obtained by performing surface plating of a highly corrosion-resistant steel or the like with the aim of imparting an anti-corrosion function. As a method of forming the clad plate, a method is proposed (for example, in Japanese Patent Application Laid-open No. Hei 5-5190) in which dissimilar steels are cold rolled and then annealed.

The laminated plate is a steel plate or metal plate obtained by sandwiching a resin or the like therebetween with the aim of imparting a damping function, thermal insulating function and the like. As a method of forming the laminated plate, a method is proposed (for example, in Japanese Patent Application Laid-open No. 2001-277271) in which a resin joined between two metal plates is melted and the two metal plates are pressure molded.

The composite material is a plate-shaped composite material produced by using a polymer, laminated foil such as a metal foil and carbon material with the aim of providing the material itself with high strength. As a method of forming the composite material made of dissimilar materials, a method is proposed (for example, in Japanese Patent Application Laid-open No. 2005-306039) in which composite parts made up of a prepreg sheet are compression molded. There is a report that the toughness and fatigue-resistant characteristic of the material itself are improved by multilayering the composite material.

In the conventional art, the clad plate is the steel plate or metal plate obtained by rolling dissimilar steels or metal plates and performing an annealing process or the like with the main aim of imparting a surface function or the like, not with the aim of making the structural material itself highly functional on the precondition that the materials are welded. Also, the laminated plate is the steel plate or metal plate obtained by melting the resin joined between two metal plates and performing pressure-molding with the aim of imparting a damping function, thermal insulating function, and the like, not with the aim of making the structural material itself highly functional on the precondition that the materials are welded.

The composite material is the plate-like material obtained by performing compression-molding on materials with the aim of making more stronger the plate-shaped multilayered material itself. There is a report that, by multilayering the composite material, toughness and fatigue strength of a brittle material such as a ceramic are improved. These findings were referenced to realize the present invention, however, studies of a balance between strength and ductility, toughness, formability, weldability, fatigue strength to which attention is being given in the present invention have not been reported.

The result is that, in the conventional multilayered materials, any structural material in which properties being incompatible with each other such as in the case of strength and ductility has not yet been achieved.

In view of solving the above problems, it is an object of the present invention to provide a multilayered steel of the steel/steel laminated type in which two properties of a steel being incompatible with each other such as in the case of high strength and high ductility can be made compatible with each other and which is excellent in strength, ductility, weldability, toughness, and fatigue strength and a method for producing the multilayered steel.

SUMMARY OF THE INVENTION

The multilayered steel stated in an aspect of the present invention is characterized by being formed by rolling, in combination, at least two kinds of steels each having different chemical composition and microstructure or different mechanical properties.

The multilayered steel stated in another aspect of the present invention is characterized by including a first layer made of a steel having microstructure comprising, as a main phase, martensite phase and a second layer made of a steel having microstructure comprising, as a main phase, at least one of austenite and ferrite phases by rolling a layered steel obtained by stacking, in layers, at least two kinds of steels each having different chemical composition and microstructure or different mechanical properties and by performing specified heat treatment on the layered steel.

The multilayered steel stated in a further aspect of the present invention is characterized by being formed by rolling, in combination, the first layer made of one or more kinds of steels comprising a steel A containing, by mass %, 0.05 to 0.4 C, 0.05 to 3.0 Si, 0.05 to 3.0 Mn and unavoidable impurities and a steel B containing, in addition to the steel A, one or more elements out of 0.001 to 0.1 mass % of Nb, 0.001 to 0.1 mass % of Ti, 0.001 to 0.5 mass % of V, 0.01 to 16.0 mass % of Cr, 0.01 to 12.0 mass % of Ni, 0.01 to 3.0 mass % of Mo, and 0.01 to 1.0 mass of Cu and the second layer made of one or more kind of steels out of a steel C containing, by mass %, 0.01 to 0.15 C, 0.01 to 1.0 Si, 0.01 to 2.0 Mn, 12.0 to 24.0 Cr, 4.0 to 14.0 Ni, and 0.001 to 0.3 N, and unavoidable impurities, a steel D containing, in addition to the steel C, one or more elements out of 0.001 to 0.1 mass % of Nb, 0.001 to 0.1 mass % of Ti, 0.001 to 0.5 mass % of V, 0.01 to 3.0 mass % of Mo, and 0.01 to 1.0 mass % of Cu, a steel E containing, by mass %, 0.001 to 0.15 C, 0.05 to 3.0 Si, 15.0 to 32.0 Mn and unavoidable impurities, a steel F containing, in addition to the steel E, one or more elements out of 0.001 to 0.1 mass % of Nb, 0.001 to 0.1 mass % of Ti, 0.001 to 0.5 mass % of V, 0.01 to 12.0 mass % of Cr, and 0.01 to 40.0 mass % of Ni, 0.01 to 3.0 mass % of Mo, 0.01 to 1.0 mass % of Cu, and 0.001 to 0.3 mass % of N, a steel G containing, by mass %, 0.0001 to 0.05 C, 0.01 to 1.0 Si, 0.01 to 2.0 Mn, and unavoidable impurities, and a steel H containing, in addition to the steel G, one or more elements out of 0.001 to 0.1 mass % of Nb, 0.001 to 0.1 mass % of Ti, 0.001 to 0.5 mass % of V, 0.01 to 12.0 mass % of Cr, 0.01 to 40.0 mass % of Ni, 0.01 to 3.0 mass % of Mo, and 0.01 to 1.0 mass % of Cu.

The multilayered steel stated in an aspect, is characterized in that, in any of the above aspects, a thickness of each layer constituting the multilayered steel is equal to or less than 125 μm.

The multilayered steel stated in another aspect is characterized in that, in any of the above aspects, the number of layers constituting the multilayered steel is equal to or more than 5.

The method for producing a multilayered steel stated in a further aspect is characterized by a process of rolling, in combination, at least two kinds of steels each having different chemical composition and microstructure or different mechanical properties to form the multilayered steel.

The method for producing a multilayered steel is characterized by processes of rolling, in combination, at least two kinds of layered steels each having different chemical composition and microstructure or different mechanical properties to form a multilayered steel including a layer stacking process of stacking, in layers, at least two kinds of steels each having different chemical composition and microstructure or different mechanical properties to form the multilayered steel and a rolling process of forming a first layer made of a steel having microstructure comprising, as a main phase, martensite phase and a second layer made of a steel having microstructure comprising, as a main phase, at least one of austenite and ferrite phases by rolling the multilayered steel and performing specified heat treatment to produce the multilayered steel having the first layer and second layer.

The method of producing a multilayered steel is characterized by a process of rolling, in combination, a first layer made of one or more kinds of steels comprising a steel A containing, by mass %, 0.05 to 0.4 C, 0.05 to 3.0 Si, 0.05 to 3.0 Mn and unavoidable impurities and a steel B containing, in addition to the steel A, one or more elements out of 0.001 to 0.1 mass % of Nb, 0.001 to 0.1 mass % of Ti, 0.001 to 0.5 mass % of V, 0.01 to 16.0 mass % of Cr, 0.01 to 12.0 mass % of Ni, 0.01 to 3.0 mass % of Mo, and 0.01 to 1.0 mass of Cu and a second layer made of one or more kind of steels out of a steel C containing, by mass %, 0.01 to 0.15 C, 0.01 to 1.0 Si, 0.01 to 2.0 Mn, 12.0 to 24.0 Cr, 4.0 to 14.0 Ni, and 0.001 to 0.3 N, and unavoidable impurities, a steel D containing, in addition to the steel C, one or more elements out of 0.001 to 0.1 mass % of Nb, 0.001 to 0.1 mass % of Ti, 0.001 to 0.5 mass % of V, 0.01 to 3.0 mass % of Mo, and 0.01 to 1.0 mass % of Cu, a steel E containing, by mass %, 0.001 to 0.15 C, 0.05 to 3.0 Si, 15.0 to 32.0 Mn and unavoidable impurities, a steel F containing, in addition to the steel E, one or more elements out of 0.001 to 0.1 mass % of Nb, 0.001 to 0.1 mass % of Ti, 0.001 to 0.5 mass % of V, 0.01 to 12.0 mass % of Cr, and 0.01 to 40.0 mass % of Ni, 0.01 to 3.0 mass % of Mo, 0.01 to 1.0 mass % of Cu, and 0.001 to 0.3 mass % of N, a steel G containing, by mass %, 0.0001 to 0.05 C, 0.01 to 1.0 Si, 0.01 to 2.0 Mn, and unavoidable impurities, and a steel H containing, in addition to the steel G, one or more elements out of 0.001 to 0.1 mass % of Nb, 0.001 to 0.1 mass % of Ti, 0.001 to 0.5 mass % of V, 0.01 to 12.0 mass % of Cr, 0.01 to 40.0 mass % of Ni, 0.01 to 3.0 mass % of Mo, and 0.01 to 1.0 mass % of Cu.

The method for producing a multilayered steel is characterized in that, in any of the above aspects, a thickness of each layer constituting the multilayered steel is equal to or less than 125 μm.

The method for producing a multilayered steel is characterized in that, in any of above aspects, the number of layers constituting the multilayered steel is equal to or more than 5.

The method for producing a multilayered steel stated in an aspect is characterized in that, in any of the aspects, the multilayered steel is formed so that a final thickness of each layer constituting the multilayered steel obtained after rolling becomes less than or equal to one half of its original thickness of each layer before rolling.

The method for producing a multilayered steel is characterized in that the rolling is hot rolling.

The method for producing a multilayered steel is characterized in that the rolling is cold rolling.

The method for producing a multilayered steel is characterized in that the rolling is warm rolling.

The method for producing a multilayered steel is characterized in that the rolling is to be performed by using at least two kinds of the hot rolling, cold rolling and warm rolling, in combination.

The method for producing a multilayered steel wherein heat treatment is performed after the rolling.

The method for producing a multilayered steel wherein the warm rolling is performed at temperature range between 200° C. and 750° C.

The method for producing a multilayered steel stated wherein the cold rolling is performed once or more with a reduction in thickness of 30% or more.

The method for producing a multilayered steel is characterized in that, in the heat treatment, soaking is performed at temperature range between 900° C. and 1250° C. for one second or more and, after the heat treatment, the steel is cooled to room temperature.

According to the multilayered steel and the method for producing the multilayered steel of the present invention, by rolling, in combination, at least two kinds of layered steels each having different chemical composition and microstructure or different mechanical properties, a multilayered steel of the steel/steel laminated type can be produced in which two properties of a steel being incompatible with each other such as in the case of high strength and high ductility can be made compatible with each other and which is excellent in strength, ductility, weldability, toughness, and fatigue strength.

DETAILED DESCRIPTION OF THE INVENTION

In the multilayered steel of the present invention, by multilayering, in combination, at least two or more kinds of steels each having different chemical composition and microstructure or different mechanical properties, properties of the steel itself can be improved.

Figure 2:
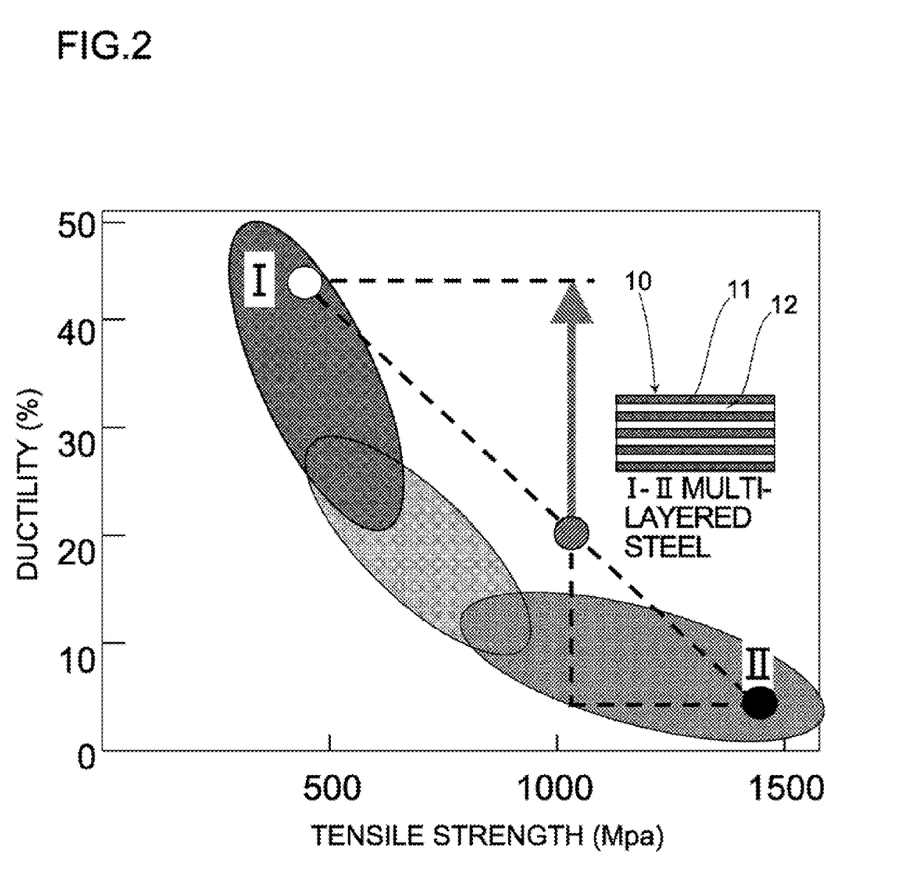
FIG. 2 is a graph used to explain the improvement of properties obtained by multilayering steels according to the present invention.

FIG. 2 is a graph used to explain the improvement of properties obtained by multilayering steels according to the present invention. Tensile strength is plotted as abscissa and ductility as ordinate. As shown in FIG. 2, the steel I has comparatively low tensile strength and comparatively high ductility, while the steel II has comparatively high tensile strength and comparatively low ductility. The inventors of the present invention have found that the tensile strength is determined by an arithmetic mean calculated using a rate of lamination between the steel I and steel II, however, the ductility exceeds the arithmetic mean by multilayering steels when an interface between steels (steel/steel) of a multilayered steel is formed. It has also turned out from further studies that the ductility is improved remarkably by controlling a thickness of the multilayered and the number of stacked layers.

Actually, the multilayered steel 10 of the present invention, as shown in FIG. 2, is made up of the first layer 12 having high strength and low ductility and the second layer 11 having low strength and high ductility. The first layer 12 serves as an even-numbered layer and the second layer 11 serves as an odd-numbered layer and odd pieces of the layers are stacked in which the even-numbered layer 12 and odd-numbered layer 11 are stacked sequentially and alternately and, by stacking so, the second layer 11 having high ductility is disposed on both the outer surfaces of the multilayered steel to be produced.

In the example of the present invention, the example is described in which 9 pieces of layers as the odd numbers of layers are stacked, however, the present invention is not limited to this case, that is, the important thing is that other odd pieces of layers such as 5 or 11 pieces of layers may be stacked so long as each of the first layers 12 having high strength and low ductility is sandwiched by each of the second layers 11 having low strength and high ductility and the second layer 11 is disposed on both outer surfaces of the multilayer.

The multilayered steel 10 of the present invention is produced by rolling, in combination, at least two kinds of steels each having different chemical composition and microstructure or different mechanical properties.

Actually, the first layer 12 making up the multilayered steel 10 is composed of a steel having microstructure comprising martensite phase as its own phase and is formed of a steel composed of martensite only or a steel composed of martensite and bainite. Also, the second layer 11 is made of a steel having microstructure comprising, as a main phase, at least one of austenite and ferrite phases.

Also, the multilayered steel 10 of the present invention is produced by rolling, in combination, the first layer 12 made of one or more kinds of steels comprising a steel A containing, by mass %, 0.05 to 0.4 C, 0.05 to 3.0 Si, 0.05 to 3.0 Mn and unavoidable impurities and a steel B containing, in addition to the steel A, one or more elements out of 0.001 to 0.1 mass % of Nb, 0.001 to 0.1 mass % of Ti, 0.001 to 0.5 mass % of V, 0.01 to 16.0 mass % of Cr, 0.01 to 12.0 mass % of Ni, 0.01 to 3.0 mass % of Mo, and 0.01 to 1.0 mass of Cu and the second layer 11 made of one or more kind of steels out of a steel C containing, by mass %, 0.01 to 0.15 C, 0.01 to 1.0 Si, 0.01 to 2.0 Mn, 12.0 to 24.0 Cr, 4.0 to 14.0 Ni, and 0.001 to 0.3 N, and unavoidable impurities, a steel D containing, in addition to the steel C, one or more elements out of 0.001 to 0.1 mass % of Nb, 0.001 to 0.1 mass % of Ti, 0.001 to 0.5 mass % of V, 0.01 to 3.0 mass % of Mo, and 0.01 to 1.0 mass % of Cu, a steel E containing, by mass %, 0.001 to 0.15 C, 0.05 to 3.0 Si, 15.0 to 32.0 Mn and unavoidable impurities, a steel F containing, in addition to the steel E, one or more elements out of 0.001 to 0.1 mass % of Nb, 0.001 to 0.1 mass % of Ti, 0.001 to 0.5 mass % of V, 0.01 to 12.0 mass % of Cr, and 0.01 to 40.0 mass % of Ni, 0.01 to 3.0 mass % of Mo, 0.01 to 1.0 mass % of Cu, and 0.001 to 0.3 mass % of N, a steel G containing, by mass %, 0.0001 to 0.05 C, 0.01 to 1.0 Si, 0.01 to 2.0 Mn, and unavoidable impurities, and a steel H containing, in addition to the steel G, one or more elements out of 0.001 to 0.1 mass % of Nb, 0.001 to 0.1 mass % of Ti, 0.001 to 0.5 mass % of V, 0.01 to 12.0 mass % of Cr, 0.01 to 40.0 mass % of Ni, 0.01 to 3.0 mass % of Mo, and 0.01 to 1.0 mass % of Cu.

The steels to be used in the present invention are not limited to a specified one so long as each of the steels has different chemical composition and microstructure or different mechanical properties and, for example, martensitic steel, austenitic steel, IF (Interstitial Free) steel, DP (Dual Phase) steel, TRIP (Transformation Induced Plasticity) steel, alloy of Ti and the like can be preferably used.

The steel to be used as the first layer 12 of the present invention is not limited to a specified one so long as the steel has high strength and it is preferable to use a steel made of one or more kinds of steels out of the steel A containing, by mass %, 0.05 to 0.4 C, 0.05 to 3.0 Si, 0.05 to 3.0 Mn and unavoidable impurities and the steel B containing, in addition to the steel A, one or more elements out of 0.001 to 0.1 mass % of Nb, 0.001 to 0.1 mass % of Ti, 0.001 to 0.5 mass % of V, 0.01 to 16.0 mass % of Cr, 0.01 to 12.0 mass % of Ni, 0.01 to 3.0 mass % of Mo, and 0.01 to 1.0 mass of Cu.

The steel to be used as the second layer 11 of the present invention is not limited to a specified one so long as the steel has high ductility and it is preferable to use a steel made of one or more kinds of steels out of the steel C containing a steel C containing, by mass %, 0.01 to 0.15 C, 0.01 to 1.0 Si, 0.01 to 2.0 Mn, 12.0 to 24.0 Cr, 4.0 to 14.0 Ni, and 0.001 to 0.3 N, and unavoidable impurities, a steel D containing, in addition to the steel C, one or more elements out of 0.001 to 0.1 mass % of Nb, 0.001 to 0.1 mass % of Ti, 0.001 to 0.5 mass % of V, 0.01 to 3.0 mass % of Mo, and 0.01 to 1.0 mass % of Cu, a steel E containing, by mass %, 0.001 to 0.15 C, 0.05 to 3.0 Si, 15.0 to 32.0 Mn and unavoidable impurities, a steel F containing, in addition to the steel E, one or more elements out of 0.001 to 0.1 mass % of Nb, 0.001 to 0.1 mass % of Ti, 0.001 to 0.5 mass % of V, 0.01 to 12.0 mass % of Cr, and 0.01 to 40.0 mass % of Ni, 0.01 to 3.0 mass % of Mo, 0.01 to 1.0 mass % of Cu, and 0.001 to 0.3 mass % of N, a steel G containing, by mass %, 0.0001 to 0.05 C, 0.01 to 1.0 Si, 0.01 to 2.0 Mn, and unavoidable impurities, and a steel H containing, in addition to the steel G, one or more elements out of 0.001 to 0.1 mass % of Nb, 0.001 to 0.1 mass % of Ti, 0.001 to 0.5 mass % of V, 0.01 to 12.0 mass % of Cr, 0.01 to 40.0 mass % of Ni, 0.01 to 3.0 mass % of Mo, and 0.01 to 1.0 mass % of Cu.

The multilayered steel of the present invention is not limited to a specified one so long as the steel is made of at least two kinds of steels each having different chemical composition and microstructure or mechanical properties. It is preferable that the first layer 12 constituting the multilayered steel 10 is made of martensitic steel and the second layer 11 constituting the multilayered steel 10 is made of austenitic steel. By rolling, in combination, a plurality of steels each having mechanical properties incompatible with each other such as in the case of high strength exhibited by the steel II and high ductility exhibited by the steel I, a steel having high strength and high ductility can be obtained. Moreover, the multilayered steel may be steel made by the combinations of different steels such as the IF steel, DP steel, TRIP steel, precipitation-hardened stainless steel and the like.

The thickness of each layer constituting the multiplayer steel 10 of the present invention after rolling is preferably 125 μm or less. By forming the multilayered steel 10 so that each layer is 125 μm or less in thickness, it is made possible to produce the multilayered steel 10 free of rapture caused by delamination, brittle rapture, local necking and the like.

Moreover, the number of layers constituting the multilayered steel 10 of the present invention in the direction of thickness to be obtained after rolling is not limited to any number of layers, however, 5 or more layers are preferable, which improves mechanical properties and weldability of the entire multilayered steel 10.

The thickness of each layer constituting the multilayered steel 10, after rolling, preferably becomes one half or less of an original thickness. The specified characteristic enhancing the effect can be obtained by the improvement of interfacial strength attributable to the rolling.

The method for producing the multilayered steel 10 of the present invention is characterized in that the multilayered steel 10 is produced by rolling, in combination, at least two or more kinds of steels each having different chemical composition and microstructure or different mechanical properties.

The method for producing the multilayered steel 10 of the present invention is characterized in that the multilayered steel 10 is produced by rolling, in combination, the first layer 12 made of one or more kinds of steels comprising the steel A containing, by mass %, 0.05 to 0.4 C, 0.05 to 3.0 Si, 0.05 to 3.0 Mn and unavoidable impurities and the steel B containing, in addition to the steel A, one or more elements out of 0.001 to 0.1 mass % of Nb, 0.001 to 0.1 mass % of Ti, 0.001 to 0.5 mass % of V, 0.01 to 16.0 mass % of Cr, 0.01 to 12.0 mass % of Ni, 0.01 to 3.0 mass % of Mo, and 0.01 to 1.0 mass of Cu and the second layer 11 made of one or more kinds of steels out of the steel C containing, by mass %, 0.01 to 0.15 C, 0.01 to 1.0 Si, 0.01 to 2.0 Mn, 12.0 to 24.0 Cr, 4.0 to 14.0 Ni, and 0.001 to 0.3 N, and unavoidable impurities, the steel D containing, in addition to the steel C, one or more elements out of 0.001 to 0.1 mass % of Nb, 0.001 to 0.1 mass % of Ti, 0.001 to 0.5 mass % of V, 0.01 to 3.0 mass % of Mo, and 0.01 to 1.0 mass % of Cu, a steel E containing, by mass %, 0.001 to 0.15 C, 0.05 to 3.0 Si, 15.0 to 32.0 Mn, and unavoidable impurities, the steel F containing, in addition to the steel E, one or more elements out of 0.001 to 0.1 mass % of Nb, 0.001 to 0.1 mass % of Ti, 0.001 to 0.5 mass % of V, 0.01 to 12.0 mass % of Cr, and 0.01 to 40.0 mass % of Ni, 0.01 to 3.0 mass % of Mo, 0.01 to 1.0 mass % of Cu, and 0.001 to 0.3 mass % of N, the steel G containing, by mass %, 0.0001 to 0.05 C, 0.01 to 1.0 Si, 0.01 to 2.0 Mn, and unavoidable impurities, and the steel H containing, in addition to the steel G, one or more elements out of 0.001 to 0.1 mass % of Nb, 0.001 to 0.1 mass % of Ti, 0.001 to 0.5 mass % of V, 0.01 to 12.0 mass % of Cr, 0.01 to 40.0 mass % of Ni, 0.01 to 3.0 mass % of Mo, and 0.01 to 1.0 mass % of Cu.

The steels to be used in the present invention are not limited to a specified one so long as each of the steels has different chemical composition and microstructure or different mechanical properties and, for example, the martensitic steel, austenitic steel, IF steel, DP steel, TRIP, precipitation-hardened steel, stainless steel and the like are preferable.

The steel to be used as the first layer 12 of the present invention is not limited to a specified one so long as the steel has high strength and it is preferable that the steel is made of one or more kinds of steels out of the steel A containing, by mass %, 0.05 to 0.4 C, 0.05 to 3.0 Si, 0.05 to 3.0 Mn, and unavoidable impurities, the steel B containing, in addition to the steel A, one or more elements out of 0.001 to 0.1 mass % of Nb, 0.001 to 0.1 mass % of Ti, 0.001 to 0.5 mass % of V, 0.01 to 16.0 mass % of Cr, 0.01 to 12.0 mass % of Ni, 0.01 to 3.0 mass % of Mo, and 0.01 to 1.0 mass of Cu.

The steel to be used as the second layer 11 of the present invention is not limited to a specified one so long as the steel has high ductility and it is preferable that the multilayered steel is made of one or more kinds of steels out of a steel C containing, by mass %, 0.01 to 0.15 C, 0.01 to 1.0 Si, 0.01 to 2.0 Mn, 12.0 to 24.0 Cr, 4.0 to 14.0 Ni, and 0.001 to 0.3 N, and unavoidable impurities, a steel D containing, in addition to the steel C, one or more elements out of 0.001 to 0.1 mass % of Nb, 0.001 to 0.1 mass % of Ti, 0.001 to 0.5 mass % of V, 0.01 to 3.0 mass % of Mo, and 0.01 to 1.0 mass % of Cu, a steel E containing, by mass %, 0.001 to 0.15 C, 0.05 to 3.0 Si, 15.0 to 32.0 Mn, and unavoidable impurities, a steel F containing, in addition to the steel E, one or more elements out of 0.001 to 0.1 mass % of Nb, 0.001 to 0.1 mass % of Ti, 0.001 to 0.5 mass % of V, 0.01 to 12.0 mass % of Cr, and 0.01 to 40.0 mass % of Ni, 0.01 to 3.0 mass % of Mo, 0.01 to 1.0 mass % of Cu, and 0.001 to 0.3 mass % of N, a steel G containing, by mass %, 0.0001 to 0.05 C, 0.01 to 1.0 Si, 0.01 to 2.0 Mn, and unavoidable impurities, and a steel H containing, in addition to the steel G, one or more elements out of 0.001 to 0.1 mass % of Nb, 0.001 to 0.1 mass % of Ti, 0.001 to 0.5 mass % of V, 0.01 to 12.0 mass % of Cr, 0.01 to 40.0 mass % of Ni, 0.01 to 3.0 mass % of Mo, and 0.01 to 1.0 mass % of Cu.

The multilayered steel 10 of the present invention is not limited to a specified one so long as the steel is made of at least two kinds of steels each having different chemical composition and microstructure or mechanical properties. It is preferable that the multilayered steel 10 is made of martensitic steel and austenitic steel. By rolling, in combination, a plurality of steels each having mechanical properties incompatible with each other such as in the case of high strength exhibited by the steel II and high ductility exhibited by the steel I, a steel having high strength and high ductility can be obtained. Moreover, the multilayered steel 10 may be steel made by the combinations of different kinds of steels such as the IF steel, DP steel, TRIP steel, precipitation-hardened stainless steel.

The thickness of each layer constituting the multiplayer steel 10 of the present invention to be obtained after rolling is preferably 125 µm or less in the direction of thickness to be obtained after rolling. By rolling and forming the multilayered steel 10 each layer of which is 125 µm or less in thickness, it is made possible to produce the multilayered steel 10 free of rapture caused by delamination, brittle rapture, local necking and the like.

Also, the number of layers constituting the multilayered steel 10 is preferably 5 or more in the direction of thickness thereof. By rolling to produce the multilayered steel 10 having 5 layers or more, the mechanical properties and weldability of the entire multilayered steel 10 can be remarkably improved.

The thickness of each layer constituting the multilayered steel 10, after rolling, preferably becomes one half or less of an original thickness. The improvement of interfacial strength attributable to the rolling provides the specified characteristic enhancing effect.

The rolling to be employed in the present invention preferably includes hot rolling, cold rolling, warm rolling, rolling using the hot rolling and cold rolling in combination, and rolling using the hot rolling and warm rolling in combination. By forming the multilayered steel by the hot rolling, cold rolling, warm rolling, rolling using the hot rolling and cold rolling in combination, and rolling using the hot rolling and warm rolling, interfacial strength can be achieved.

In practice, in the case of the hot rolling, for example, by heating a rolling roller used to roll the multilayered steel 10 to a predetermined temperature, the rolling and heat treatment are simultaneously performed on the multilayered steel 10.

That is, in this case, at least two kinds of steels each having different chemical composition and microstructure or mechanical properties are first stacked in layers sequentially and alternately to produce a layered steel.

Next, by rolling the multilayered steel 10 using the rolling roller pre-heated to a predetermined temperature and by performing the specified heat treatment, the first layer 12 made of a steel having microstructure comprising martensite phase as its main phase and having high strength and low ductility and the second layer 11 made of a steel having microstructure comprising, as a main phase, at least one of austenite and ferrite phases and having low strength and high ductility are formed.

Thus, these first and second layers are sequentially and alternately stacked and the multilayered steel 10 on both sides of which the second layers are disposed can be produced.

On the other hand, in the case of the cold rolling and warm rolling, the above multilayered steel 10 is first rolled using the rolling roller to produce a multilayered rolled steel.

Next, by performing the heat treatment on the multilayered rolled steel, the first layer 12 made of the steel having microstructure comprising martensite phase as its main phase and having high strength and low ductility and the second layer 11 made of the steel having microstructure comprising, as its main phase, at least one of austenite and ferrite phases and having low strength and high ductility are formed.

Thus, these first 12 and second layers 11 are sequentially and alternately stacked and the multilayered steel 10 on both sides of which the second layers are disposed can be produced.

Incidentally, in the case of the hot rolling, if the hot rolling is performed at excessively high temperature, atom movements caused by thermal diffusion occur between the first layer and second layers, causing changes in compositions of the first and second layers whereby a synergetic effect expected by the stacking of the layers is made to decrease.

On the other hand, the warm rolling and cold rolling are performed at a temperature being lower than the temperature at which the hot rolling is performed and, therefore, no atom movements occur between the first and second layers and it is made possible to prevent the decrease in the synergetic effect expected by the stacking of the layers.

In the case where the warm rolling is performed mainly, it is desirous that, after heating or hot rolling, the layered steels are cooled or heating is started at room temperature and most of the heating and rolling processes are performed at the temperature range between 200° C. and 750° C. The reason for this is that, if the rolling is performed at a temperature being lower than 200° C., the deformation resistance of the layered steel becomes high and, if the temperature is higher than 750° C., the composition is made to be changed and an undesired steel is formed.

Also, when the cold rolling is mainly performed, it is desirous that a pass process achieving a reduction in thickness of 30% or more per one pass is employed at least one time or more. This is because, if the draft is 30% or less, the ductility of the multilayered steel can not be improved. Incidentally, the draft denotes a decreasing rate in thickness of a layer obtained after rolling relative to thickness of the layer before rolling.

It is desirous that specified heat treatment is performed at temperature range between several hundred ° C. and several thousand ° C. for a time period between about 1 second to several hours (that is, for one or more seconds). It is also desirous that the heat treatment is performed at temperature range between 900° C. and 1250° C. since, if the heat treatment is performed at a temperature below 900° C. or above 1250° C., the ductility can not be improved up to a desired level. Moreover, the heat treatment may be performed separately without simultaneous treatment with rolling. Also, after the heat treatment, a cooling process may be performed by using air-cooling, water-cooling, or steam-cooling methods. By performing heat treatment on the multilayered steel after rolling, its mechanical properties can be made uniform in both the directions of length and thickness of the multilayered steel.

Hereinafter, the present invention is further described in detail using specified examples, however, the present invention is not limited to the examples and, for example, the rolling may use at least two or more rolling methods out of the hot rolling, cold rolling, and warm rolling.

EXAMPLE I

In order to produce the multilayered steel of the present invention being capable of achieving compatibility of its properties which are incompatible with each other such as in the case of high strength and high ductility and being excellent in strength, ductility, weldability, toughness, and fatigue strength, it is necessary to form the multiplayer steel free from brittle fracture and necking.

In the example I, after the determination of conditions for forming the multiplayer steel not causing brittle rapture, conditions for forming the multiplayer steel not causing the necking was determined. Further, based on conditions for forming the multilayered steel not causing brittle rapture and necking, the multilayered steel is formed.

Figure 3A:
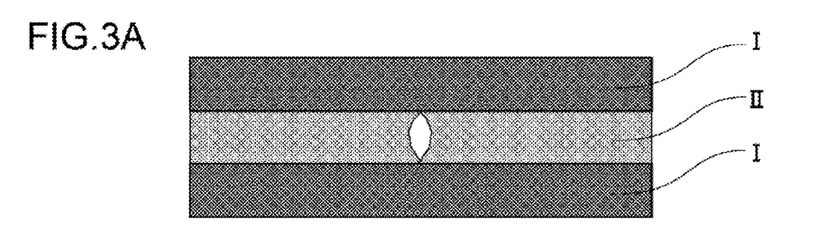
FIG. 3 is a diagram showing an example of brittle fracture of a multilayered steel according to the producing method of the present invention.
Figure 3B:
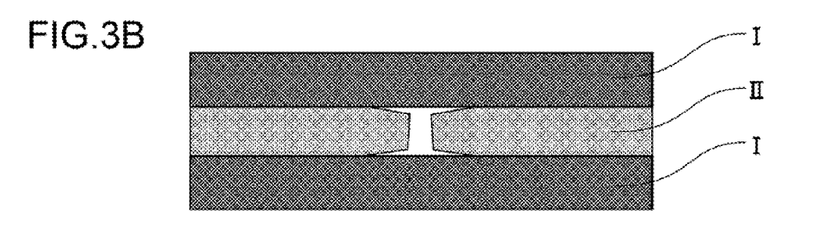

FIG. 3 shows examples of brittle fracture being one of fracture types of the multilayer layer. FIG. 3(A) is an example of brittle rapture and FIG. 3(B) is an example of rapture caused by delamination. The brittle rapture is a rapture type caused by the satisfaction of brittle rapture conditions. The brittle rapture is a state where the thickness of one intermediate layer constituting the multilayered steel exceeds that of a critical layer. The rapture caused by delamination is a state where the peel conditions are satisfied. The peel condition is a state where interfacial strength between the layer and one intermediate layer in the multilayered steel becomes below interlayer peel strength (interlayer peel energy) or less.

Figure 4:
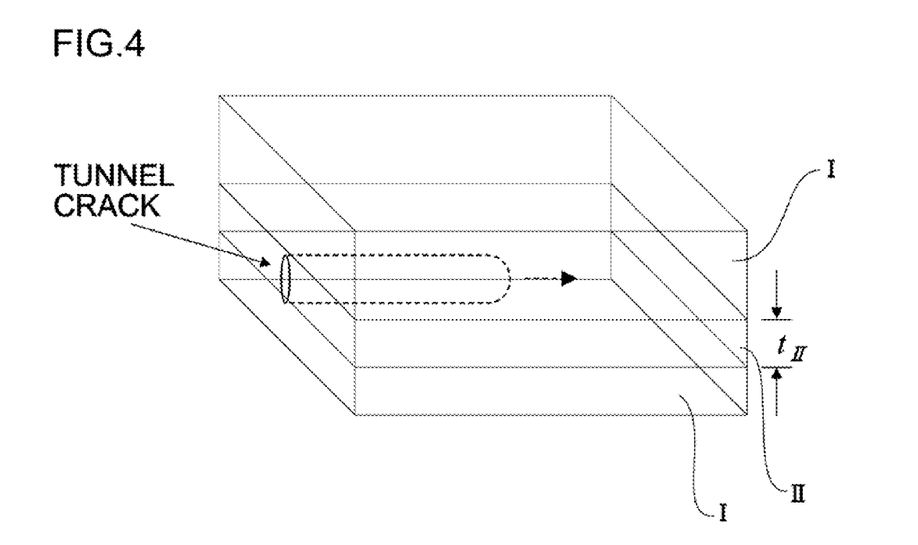
FIG. 4 is a diagram used to explain a brittle rupture condition of a multilayered steel according to the producing method of the present invention.

FIG. 4 is a diagram used to explain a crack progressing condition being a brittle rapture condition of the multilayered steel. When the crack progressing condition is met in the layer A having a layer thickness $t_{II}$ in the multilayered steel and brittle rapture occurs, a crack called a "Tunnel crack" as shown in FIG. 4 occurs. The crack progressing condition can be represented by crack initiation energy $W_c$ and release strain energy $W_m$.

The crack initiation energy $W_c$ is represented by Equation 1.

$$W_c = 2 t_{II} \gamma_{II}$$

where $t_{II}$ denotes thickness of the steel II and $\gamma_{II}$ denotes surface energy of the steel II.

The release strain energy $W_m$ is represented by Equation 2.

$$W_m = \int_0^{\gamma_{II}} G(a)\,da = \frac{\pi t_{II}^2 \sigma_1^2}{E_{II}} \quad \text{[Equation 2]}$$

where $t_{II}$ denotes thickness of the steel II, $E_{II}$ denotes a Young's modulus of the steel II, and $\sigma_1$ denotes tensile load per unit area.

The crack progressing condition is that the crack initiation energy $W_c \geq$ (greater than or equal to) the release strain energy $W_m$. When the condition that the crack initiation energy $W_c \geq$ the release strain energy $W_m$ is satisfied, the crack progresses, causing the occurrence of the brittle rapture.

On the other hand, when the condition that the crack initiation energy $W_c <$ the release strain energy $W_m$ is satisfied, the crack does not progress, causing no occurrence of the brittle rapture.

The critical layer thickness $t_{II}^{Cr}$ to be obtained when no crack occurs and no brittle rapture occurs in the layer II can be represented by Equation 3.

$$t_{II}^{Cr} = \frac{2}{\pi} \frac{\gamma_{II} E_{II}}{\sigma_1^2} \quad \text{[Equation 3]}$$

where $t_{II}^{Cr}$ denotes critical layer thickness of the layer II. $\gamma_{II}$ denotes strength of the layer II, $E_{II}$ denotes a Young's modulus of the steel II, and $\sigma_1$ denotes tensile strength.

In reality, the critical layer thickness to be obtained when martensitic steel is used as the layer II serving as an intermediate layer out of layers employed in the multilayered steel was calculated. The critical layer thickness $t_{II}^{Cr}$ obtained when fracture toughness $K_{IC}$ of martensite is 20 MPa√m, Young's modulus $E_{II}$ is 200 GPa, and tensile strength $\sigma_1$ is 1 GPa was calculated to be 125 μm by using Equation 4. Therefore, it has turned out that, if the layer thickness is 125 μm or less, neither crack nor brittle rapture occurs On the other hand, the peel condition of multiplayer steel can be represented by interfacial strength $\gamma_{int}$ and interlayer peel strength (interlayer peel energy) $G_d$. The interlayer peel strength $G_d$ is represented by Equation 4.

$$G_d = 0.26 G_p \quad \text{[Equation 4]}$$

where $G_d$ denotes interlayer peel strength and $G_p$ denotes an energy release rate of a crack occurring at right angles to an interface in the multilayered steel.

Also, the energy release rate $G_p$ of the crack occurring in a direction at right angles to the interface in the multilayered steel is represented by Equation 5.

$$G_p = \frac{\pi t_{II} \sigma_1^2}{E_{II}} \quad \text{[Equation 5]}$$

where $G_p$ denotes the energy release rate of the crack occurring at right angles to an interface in the layer, $t_{II}$ denotes the thickness of the layer II, $E_{II}$ denotes a Young's modulus of the steel II, and $\sigma_1$ denotes tensile strength.

The peel fracture condition is that the interfacial strength $\gamma_{int} <$ interlayer peel strength $G_d$. When the condition that interfacial strength $\gamma_{int} <$ interlayer peel strength $G_d$ is satisfied, the peel fracture occurs.

On the other hand, when the condition that interfacial strength $\gamma_{int} >$ interlayer peel strength $G_d$ is satisfied, the peel fracture does not occur.

In practice, the interfacial strength $\gamma_{int}$ obtained when the layer II using the martensitic steel, out of steels to be used for the multilayered steel, as an intermediate layer, was calculated. The interfacial strength $\gamma_{int}$ obtained when the Young's modulus $E_{II}$ of the martensitic steel was 200 GPa, its tensile strength $\sigma_1$ was 1 GPa, and critical layer thickness $t_{II}^{Cr}$ was 125 μm, was calculated to be 500 J/m². Therefore, it was found that if the interfacial strength $\gamma_{int}$ was calculated to be 500 J/m² or more from Equations 4 and 5, the peel fracture did not occur.

Figure 5:
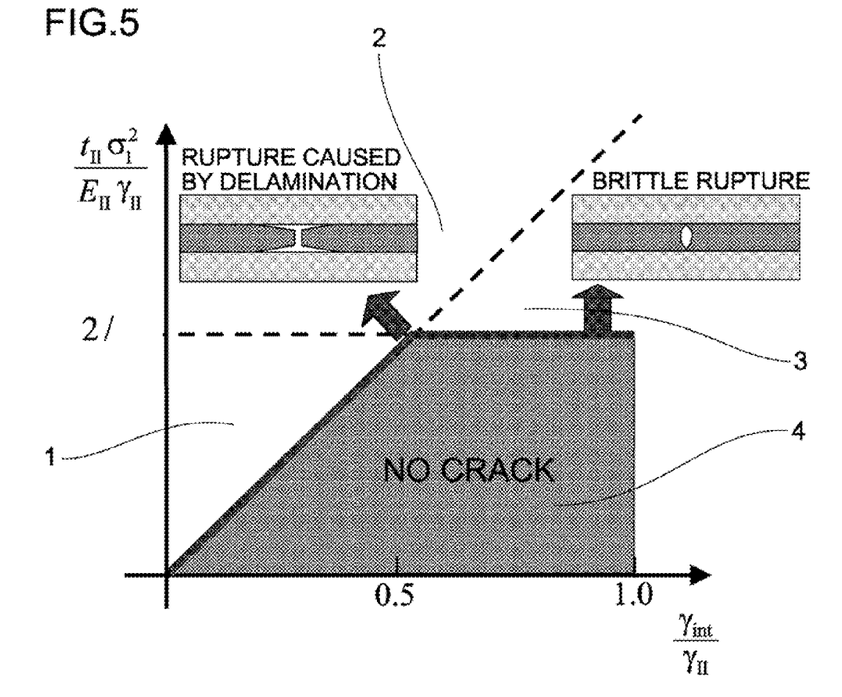
FIG. 5 is a graph showing a condition for the multiplayer steel free from cracks according to the producing method of the present invention.

FIG. 5 is a graph showing the range in which the multilayered steel free from brittle rupture and peel rupture can be obtained. The interfacial strength $\gamma_{int}$ relative to the strength $\gamma_{II}$ is plotted as abscissa and the interlayer peel strength $G_d$ relative to the strength $\gamma_{II}$ as ordinate. The regions 1 and 2 in the graph are regions where rapture caused by delamination occurs and the region 3 is a region where brittle rupture occurs. By forming the multilayered steel in the region 4 other than the regions 1, 2, and 3, the multilayered steel free from the brittle rapture and rapture caused by delamination can be obtained.

Actually, the multilayered steel free from brittle rapture and rapture caused by delamination can be obtained on the conditions that, when the martensitic steel, chosen out of steels to be used for producing the multilayered steel, is used as the layer II serving as the intermediate layer, the fracture toughness $K_{IC}$ of martensite is 20 MPa√m, the Young's modulus $E_{II}$ of the martensitic steel is 200 GPa, its tensile strength $\sigma_1$ is 1 GPa, critical layer thickness $t_{II}^{Cr}$ is 125 μm or less, the interfacial strength $\gamma_{int}$ is 500 J/m² or more.

Next is determined the condition for forming a multilayered steel not only free from brittle rapture and rapture caused by delamination but also free from necking which is another fracture type of a steel.

Figure 6A:
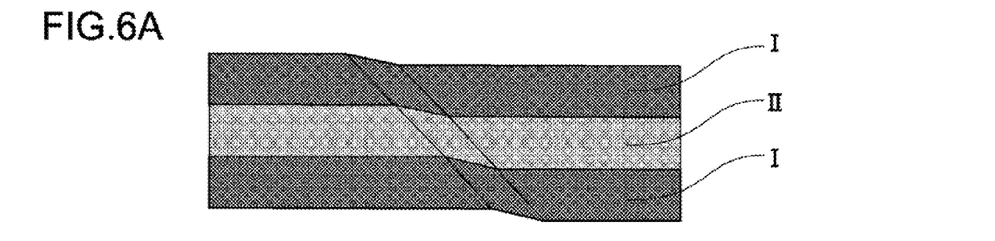
FIG. 6 is a diagram showing an example of necking in the multilayered steel according to the producing method of the present invention.
Figure 6B:
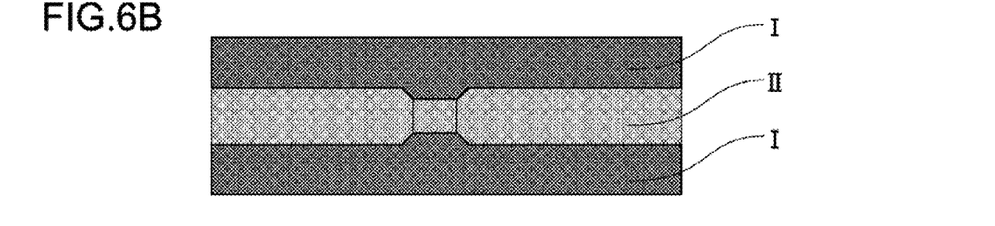

FIG. 6 shows an example of necking being one of fracture types of multilayered steel. FIG. 6(A) is an example of an entire necking and FIG. 6(B) is an example of local necking. The occurrence of the local necking causes the inhibition of ductility of a multilayered steel. If it is hypothesized that the occurrence of necking follows the von Mises yield condition, the necking can be represented by Equation 6.

$$\frac{d\overline{\sigma}}{d\overline{\varepsilon}} = k_1 n_1 \overline{\varepsilon}^{n_1-1} + k_2 n_2 \overline{\varepsilon}^{n_2-1} \quad \text{[Equation 6]}$$
$$= k_1 \overline{\varepsilon}^{n_1} + k_2 \overline{\varepsilon}^{n_2}$$

where $k_1$ and $k_2$ denote constants, $n_1$ and $n_2$ denote a work hardening exponent, and $\epsilon$ denotes deformation. The occurrence condition for the local necking can be represented by Equation 7.

$$\frac{d\overline{\sigma}}{d\overline{\varepsilon}} = \overline{\sigma} - \alpha \frac{t_{II}}{t_I} \frac{E_{II} l_{II}}{t_{II}} = n_1 \left(\frac{\overline{\sigma}}{\overline{\varepsilon}}\right) \quad \text{[Equation 7]}$$
$$\overline{\varepsilon}_u = n_1 \frac{\overline{\sigma}}{\overline{\sigma} - \alpha \frac{t_{II}}{t_I} \frac{E_{II} l_{II}}{t_{II}}}$$

where $\epsilon_u$ denotes uniform elongation, $n_1$ denotes a work hardening exponent, $\sigma$ denotes tensile strength, $\alpha$ denotes a constant, $t_1$ denotes thickness of layer steel I, $t_{II}$ denotes thickness of layer steel II, $E_{II}$ denotes a Young's modulus of the steel II, and $L_{II}$ denotes a particle diameter of the steel II.

By forming the multilayered steel based on the condition for the occurrence of entire necking or for the occurrence of local necking, the multilayered steel free from the entire necking and local necking can be obtained.

In order to produce the multilayered steel of the present invention being capable of achieving compatibility of its properties which are incompatible with each other such as in the case of high strength and high ductility and being excellent in strength, ductility, weldability, toughness, and fatigue strength, the formation of the multilayered steel was performed based on conditions for forming the multilayered steel free from brittle fracture and free from necking described above.

By rolling, in combination, at least two kinds of steels each having different chemical composition and microstructure or different mechanical properties and performing the control of hetero-interface, the multilayered steel of the present invention was produced. The strength and elongation of the steel used for the combination of layered steels are shown in Table 1.

TABLE 1

| MATERIAL | STRENGTH (MPa) | ELONGATION (%) |
|---|---|---|
| STEEL A | 1200 | 8 |
| STEEL B | 1400 | 5 |
| STEEL C | 700 | 60 |
| STEEL D | 800 | 50 |
| STEEL E | 700 | 50 |
| STEEL F | 800 | 40 |

The steels used for the combination of layered steels are not limited to those shown in Table 1 and the steel G and steel H described below were also employed. The composition of the steel used for the combination of layered steels are as follows: The steel comprises one or more steels A containing, by mass %, 0.05 to 0.4 C, 0.05 to 3.0 Si, 0.05 to 3.0 Mn and unavoidable impurities, the steel B containing, in addition to the steel A, one or more elements out of 0.001 to 0.1 mass % of Nb, 0.001 to 0.1 mass % of Ti, 0.001 to 0.5 mass % of V, 0.01 to 16.0 mass % of Cr, 0.01 to 12.0 mass % of Ni, 0.01 to 3.0 mass % of Mo, and 0.01 to 1.0 mass of Cu, the steel C containing, by mass %, 0.01 to 0.15 C, 0.01 to 1.0 Si, 0.01 to 2.0 Mn, 12.0 to 24.0 Cr, 4.0 to 14.0 Ni, and 0.001 to 0.3 N, and unavoidable impurities, the steel D containing, in addition to the steel C, one or more elements out of 0.001 to 0.1 mass % of Nb, 0.001 to 0.1 mass % of Ti, 0.001 to 0.5 mass % of V, 0.01 to 3.0 mass % of Mo, and 0.01 to 1.0 mass % of Cu, the steel E containing, by mass %, 0.001 to 0.15 C, 0.05 to 3.0 Si, 15.0 to 32.0 Mn, and unavoidable impurities, the steel F containing, in addition to the steel E, one or more elements out of 0.001 to 0.1 mass % of Nb, 0.001 to 0.1 mass % of Ti, 0.001 to 0.5 mass % of V, 0.01 to 12.0 mass % of Cr, and 0.01 to 12.0 mass % of Ni, 0.01 to 3.0 mass % of Mo, 0.01 to 1.0 mass % of Cu, and 0.001 to 0.3 mass % of N, the steel G containing, by mass %, 0.0001 to 0.05 C, 0.01 to 1.0 Si, 0.01 to 2.0 Mn, and unavoidable impurities, and the steel H containing, in addition to the steel G, one or more elements out of 0.001 to 0.1 mass % of Nb, 0.001 to 0.1 mass % of Ti, 0.001 to 0.5 mass % of V, 0.01 to 12.0 mass % of Cr, 0.01 to 40.0 mass % of Ni, 0.01 to 3.0 mass % of Mo, and 0.01 to 1.0 mass % of Cu.

The multilayered steel was produced by using at least two steels out of the above steel A to steel H. Moreover, the multilayered steel made up of the first layer and second layer can be formed by using the above steel A to steel H.

The first layer was composed of one kind or more kinds out of the steels A and B each having high strength. Also, the second layer was composed of one or more steels C, D, E, F, G, and H, each having high ductility. The multilayered steel was produced using the first and second layers.

In order to obtain the multilayered steel of the present invention being capable of achieving compatibility of its properties which are incompatible with each other such as in the case of high strength and high ductility and being excellent in strength, ductility, weldability, toughness, fatigue strength, the multilayered steel was produced in a manner in which the above-determined conditions for forming the multiplayer steel free from brittle fracture and necking were satisfied.

Figure 7:
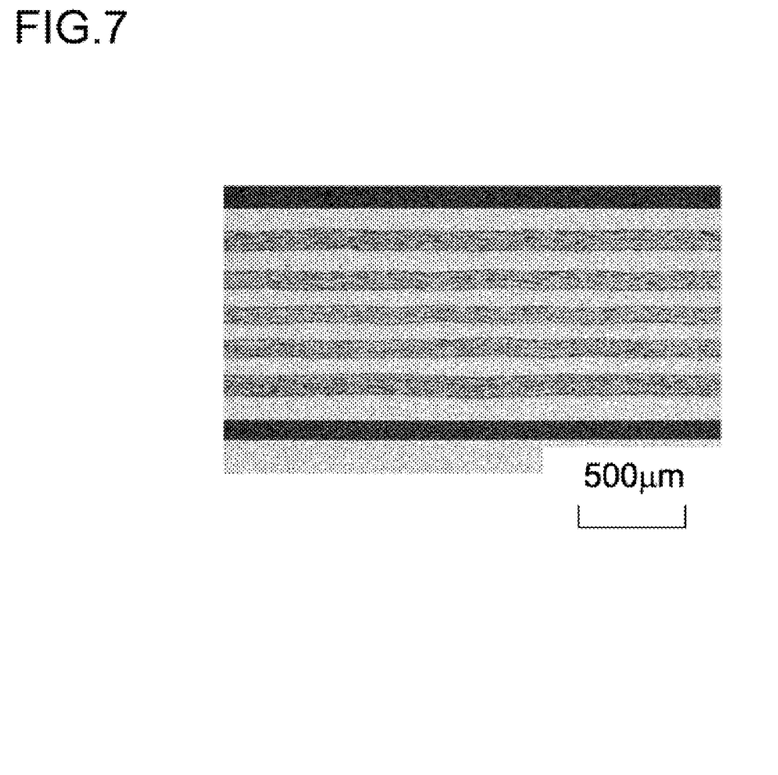
FIG. 7 is a photograph of the multilayered steel before being rolled according to the producing method of the present invention.

FIG. 7 is a photograph of a cross section of the multilayered steel formed as above. The steel used for the combination of the multilayered steel is 0.15C-1.5Mn steel and SUS316 steel. The number of layers constituting the multilayered steel is 11, its layer thickness is 125 μm, and the thickness of each layer constituting the multilayered steel itself is 1 mm. In the example 1, the hot rolling was performed on the multilayered steel until its thickness reaches 5 mm and the cold rolling was performed until its thickness reaches 1 mm after having reached 5 mm and thereafter.

Figure 8:
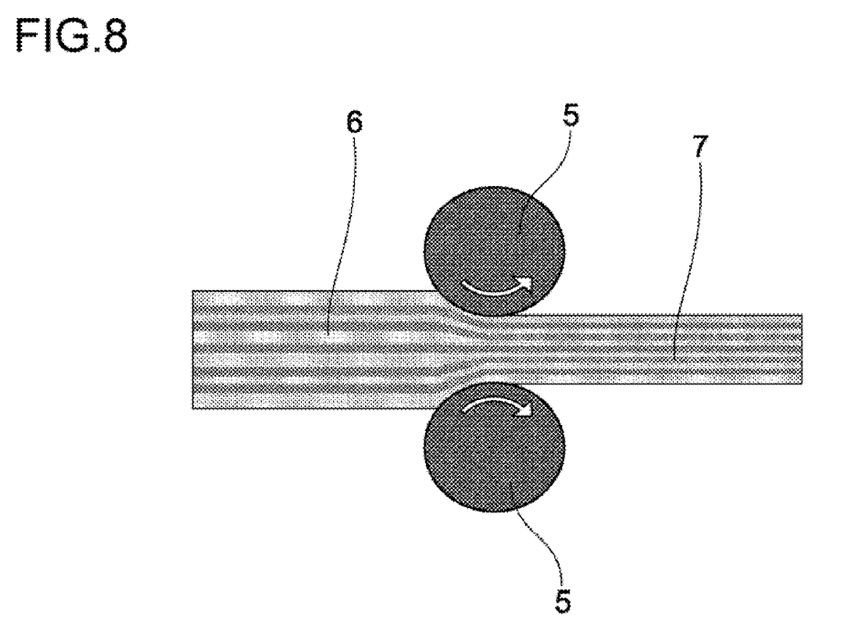
FIG. 8 is a diagram schematically showing the rolling method of the multilayered steel employed according to the producing method of the present invention.

FIG. 8 is a diagram schematically showing the rolling method of the multilayered steel. According to the rolling method of the example of the present invention, by performing the cold rolling on the multilayered steel 6 using the rolling roller 5 based on conditions for forming the multilayered steel determined as above on which the occurrence of the brittle fracture and/or necking can be prevented, the multilayered rolled steel 7 can be obtained. In the example 1, the hot rolling was performed on the multilayered rolled steel 7 until its thickness reached 5 mm and the cold rolling was performed until its thickness reached 1 mm after having reached 5 mm and thereafter.

The heat treatment was performed on the multilayered rolled steel 7 which was produced by rolling the layered steel 6 in which the rolling treatment and heat treatment were not performed at the same time but performed separately. The conditions for the heat treatment were that heating was performed at temperature range between 900° C. to 1250° C. and for a period of time between 1 second and 3600 seconds. By cooling, after the completion of the heat treatment, the multilayered rolled steel 7 to room temperature by water-cooling or air-cooling, the multilayered steel was obtained. The tensile strength of the obtained multilayered steel was in the range between 1000 MPa and 1100 MPa and elongation was 40% to 50%.

Additionally, in the example 1 of the present invention, a typical rolling mill was used as the rolling apparatus, however, the rolling apparatus such as a shear-added rolling mill, reducing rolling mill, tensile force reducing rolling mill, drawing rolling mill, melt rolling mill may be used. Moreover, in the example, the conditions for the heat treatment are that heating is performed at temperature range between 900° C. to 1250° C., however, may be performed at temperature range between several hundred ° C. and several thousand ° C. Moreover, the conditions for the heat treatment are that the heating is continued for a period of time between 1 second to 3600 seconds and holding time is within 1 second to 3600 seconds, however, soaking is performed for one or more seconds, the holding time may be in a range of several seconds to several hours. The multilayered steel may be formed, when necessary, without the heat treatment after being rolled. Besides, in the example 1, air cooling is performed after the heat treatment, however, the water cooling or steam cooling method can be employed as well.

Thus, it has been confirmed that, the producing method of the multilayered steel of the present invention has the effect that, by rolling, in combination, at least two kinds of steels each having different chemical composition and microstructure or different mechanical properties, it is made possible to obtain the multilayered steel of the steel/steel laminated type in which properties being incompatible with each other such as in the case of high strength and high ductility can be compatible with each other and which is excellent in strength, ductility, weldability, toughness, and fatigue strength.

EXAMPLE 2 (DEMONSTRATIVE)

Next, in order to demonstrate the facts described above, a plurality of kinds of multilayered steel was produced and its strength and ductility were verified. First, as shown in Table 2, a plurality of kinds of substances arbitrarily selected out of C, Si, Mn, Cu, Ni, Cr, Mo, V, Ti, and N is mixed so as to contain the specified percent by mass to produce the steels A, B1, B2, B3, C, D, E, F, G to use them as materials.

TABLE 2

| | CHEMICAL COMPOSITION (wt %) OF TEST PIECES | | | | | | | | | |
|---|---|---|---|---|---|---|---|---|---|---|
| MATERIAL | C | Si | Mn | Cu | Ni | Cr | Mo | V | Ti | N |
| STEEL A | 0.25 | 0.25 | 1.40 | — | — | — | — | — | — | 0.008 |
| STEEL B1 | 0.13 | 0.25 | 0.90 | 0.19 | 0.02 | 0.83 | 0.34 | 0.03 | — | 0.006 |
| STEEL B2 | 0.06 | 0.49 | 0.40 | — | 0.10 | 12.20 | — | — | — | 0.01 |
| STEEL B3 | 0.32 | 0.79 | 0.60 | — | — | 13.52 | — | — | — | 0.007 |
| STEEL C | 0.04 | 0.41 | 0.84 | — | 8.51 | 18.11 | — | — | — | 0.04 |
| STEEL D | 0.02 | 0.63 | 0.84 | — | 12.09 | 17.73 | 2.12 | — | — | 0.03 |
| STEEL E | 0.01 | 0.10 | 24.00 | — | — | — | — | — | — | 0.003 |
| STEEL F | 0.02 | 0.01 | 0.16 | — | — | — | — | — | — | 0.02 |
| STEEL G | 0.005 | 0.20 | 0.40 | — | — | — | — | — | 0.03 | 0.002 |

Next, as shown in FIG. 3, the multilayered steels of 19 kinds in total including the multilayered steels shown in the examples 1 to 16 and comparative examples 1 to 3 in Table 3 were produced using the material 1 containing one kind out of the steels A, B1, B2, and B3 and the material 2 containing one kind out of the steels C, D, E, F, and G in combination to measure strength and ductility of these multilayered steels.

TABLE 3

| | MATERIAL 1 (EVEN-NUMBERED LAYER) | MATERIAL 2 (ODD-NUMBERED LAYER) | MATERIAL 1 THICK-NESS (mm) | MATERIAL 2 THICK-NESS (mm) | FINISH THICK-NESS (mm) | NUMBER OF STACKED LAYERS | THICKNESS PER LAYER (μM) | PROCESS |
|---|---|---|---|---|---|---|---|---|
| EXAMPLE 1 | STEEL A | STEEL C | 5.0 | 5.0 | 1.0 | 9 | 111 | HOT ROLLING + COLD ROLLING |
| EXAMPLE 2 | STEEL A | STEEL C | 1.0 | 1.0 | 1.0 | 9 | 111 | COLD ROLLING |

TABLE 3-continued

| | | | | | | | | |
|---|---|---|---|---|---|---|---|---|
| EXAMPLE 3 | STEEL A | STEEL D | 5.0 | 6.0 | 1.2 | 11 | 109 | HOT ROLLING + COLD ROLLING |
| EXAMPLE 4 | STEEL A | STEEL D | 1.0 | 1.0 | 0.8 | 11 | 73 | COLD ROLLING |
| EXAMPLE 5 | STEEL A | STEEL E | 5.0 | 4.5 | 1.2 | 11 | 109 | HOT ROLLING + COLD ROLLING |
| EXAMPLE 6 | STEEL A | STEEL F | 1.0 | 1.0 | 1.0 | 9 | 111 | COLD ROLLING |
| EXAMPLE 7 | STEEL A | STEEL G | 1.0 | 1.0 | 0.8 | 11 | 73 | COLD ROLLING |
| EXAMPLE 8 | STEEL B1 | STEEL C | 5.0 | 5.0 | 1.0 | 13 | 77 | HOT ROLLING + COLD ROLLING |
| EXAMPLE 9 | STEEL B1 | STEEL C | 1.2 | 1.0 | 1.0 | 11 | 91 | COLD ROLLING |
| EXAMPLE 10 | STEEL B1 | STEEL C | 1.2 | 1.0 | 1.0 | 11 | 91 | WARM ROLLING |
| EXAMPLE 11 | STEEL B1 | STEEL E | 5.0 | 4.5 | 1.0 | 9 | 111 | HOT ROLLING + COLD ROLLING |
| EXAMPLE 12 | STEEL B1 | STEEL G | 1.2 | 1.0 | 0.8 | 11 | 73 | COLD ROLLING |
| EXAMPLE 13 | STEEL B2 | STEEL C | 1.2 | 1.0 | 1.0 | 11 | 91 | WARM ROLLING |
| EXAMPLE 14 | STEEL B2 | STEEL G | 1.2 | 1.0 | 1.0 | 11 | 91 | WARM ROLLING |
| EXAMPLE 15 | STEEL B3 | STEEL C | 1.2 | 1.0 | 1.0 | 11 | 91 | WARM ROLLING |
| EXAMPLE 16 | STEEL B3 | STEEL G | 1.2 | 1.0 | 1.0 | 11 | 91 | WARM ROLLING |
| COMPARATIVE EXAMPLE 1 | STEEL A | STEEL C | 1.0 | 1.0 | 1.0 | 9 | 111 | COLD ROLLING |
| COMPARATIVE EXAMPLE 2 | STEEL B1 | STEEL C | 1.2 | 1.0 | 1.0 | 11 | 91 | COLD ROLLING |
| COMPARATIVE EXAMPLE 2 | STEEL B1 | STEEL G | 1.2 | 1.0 | 0.8 | 11 | 73 | COLD ROLLING |

| | TEMPERATURE FOR HOT ROLLING OR WARM ROLLING (° C.) | MAXIMUM PASS REDUCTION FOR COLD ROLLING MAINLY PERFORMED(%) | HEAT TREATMENT | CONSTITUENT PHASE OF LAYER OF MATERIAL 1 | CONSTITUENT PHASE OF LAYER OF MATERIAL 2 | TS [MPa] | EL [%] |
|---|---|---|---|---|---|---|---|
| EXAMPLE 1 | 1000 | | 1000° C. × 2 min., WATER COOLING | MARTENSITE | AUSTENITE | 1030 | 27 |
| EXAMPLE 2 | | 50 | 1000° C. × 2 min., WATER COOLING | MARTENSITE | AUSTENITE | 1080 | 23 |
| EXAMPLE 3 | 1100 | | 1050° C. × 2 min., WATER COOLING | MARTENSITE | AUSTENITE | 1000 | 28 |
| EXAMPLE 4 | | 50 | 1050° C. × 2 min., WATER COOLING | MARTENSITE | AUSTENITE | 1060 | 28 |
| EXAMPLE 5 | 1150 | | 1100° C. × 2 min., WATER COOLING | MARTENSITE | AUSTENITE | 1150 | 34 |
| EXAMPLE 6 | | 50 | 1000° C. × 2 min., AIR COOLING | MARTENSITE | FERRITE | 980 | 26 |
| EXAMPLE 7 | | 60 | 1000° C. × 2 min., WATER COOLING | MARTENSITE | FERRITE | 950 | 33 |
| EXAMPLE 8 | 1150 | | 1000° C. × 2 min., WATER COOLING | MARTENSITE | AUSTENITE | 1060 | 28 |
| EXAMPLE 9 | | 40 | 1000° C. × 2 min., WATER COOLING | MARTENSITE | AUSTENITE | 1090 | 27 |
| EXAMPLE 10 | 550 | | 1000° C. × 2 min., WATER COOLING | MARTENSITE | AUSTENITE | 1080 | 27 |
| EXAMPLE 11 | 1150 | | 1050° C. × 2 min., AIR COOLING | MARTENSITE | AUSTENITE | 1050 | 30 |
| EXAMPLE 12 | | 50 | 1000° C. × 2 min., WATER COOLING | MARTENSITE | FERRITE | 1040 | 27 |

TABLE 3-continued

| | | | | | | | |
|---|---|---|---|---|---|---|---|
| EXAMPLE 13 | 550 | | 1000° C. × 2 min., WATER COOLING | MARTENSITE | AUSTENITE | 1110 | 26 |
| EXAMPLE 14 | 550 | | 1000° C. × 2 min., WATER COOLING | MARTENSITE | FERRITE | 1080 | 24 |
| EXAMPLE 15 | 550 | | 1000° C. × 2 min., WATER COOLING | MARTENSITE | AUSTENITE | 1220 | 25 |
| EXAMPLE 16 | 550 | | 1000° C. × 2 min., WATER COOLING | MARTENSITE | FERRITE | 1200 | 23 |
| COMPARATIVE EXAMPLE 1 | | 50 | 800° C. × 2 min., WATER COOLING | MARTENSITE | AUSTENITE | 1080 | 6 |
| COMPARATIVE EXAMPLE 2 | | 20 | 1000° C. × 2 min., WATER COOLING | MARTENSITE | AUSTENITE | 950 | 4 |
| COMPARATIVE EXAMPLE 2 | | 50 | 1000° C. × 2 min., MILD COOLING (FURNACE COOLING) | FERRITE | FERRITE | 710 | 19 |

In the example 1 in Table 3, for example, the plate-shaped steel A having a thickness of 5.00 mm (hereinafter, referred to as "material 1 thickness") was used as the material 1 . Also, the plate-shaped steel C having a thickness of 5.00 mm (hereinafter, referred to as "material 2 thickness") was used as the material 1.

Then, the material 1 was used as an even-numbered layer and the material 2 was used as an odd-numbered layer and 9 layers in total were stacked sequentially and alternately with the material 2 being disposed on both the outer surface of the multilayered steel.

Next, in a process of rolling the multilayered steel (in Table 3, simply referred to as a process), hot rolling and cold rolling were used. In the case of the hot rolling, the multilayered steel was rolled by a rolling roller at temperature of 1000° C. to produce the multilayered rolled steel.

Then, heat treatment was performed on the multilayered rolled steel at temperature 1000° C. for about 2 minutes and cooled by a water-cooling method to produce the multilayered steel of the example 1 in Table 3.

The thickness per one layer constituting the multilayered steel of the example 1 was 111 μm including the thickness of 1.0 mm as a finish thickness.

When each layer of the multilayered steel of the example 2 in Table 3 produced as above was observed or hardness thereof was measured by an optical microscope, it was confirmed that the constitute phase of the material 1 (that is, layer formed by the material 1) serving as the first layer was martensite and the constitute phase of the material 2 (that is, layer formed by the material 2) serving as the second layer was austenite.

Then, when strength and ductility of the multilayered steel of the example 1 in Table 3 were measured, it was confirmed that the tensile strength (in FIG. 3, shown as TS) was 1030 MPa and elongation ductility (in FIG. 3, shown as EL) was 27%.

Thus, in the example 1 in Table 3, it was confirmed by the results from the measurement of strength and ductility and by the verification shown in FIG. 2 that the multilayered steel being capable of achieving compatibility of its properties which were incompatible with each other such as in the case of high strength and high ductility and being excellent in strength, ductility, weldability, toughness, and fatigue strength was able to be obtained.

Also, in the example 2 in Table 3, for example, the plate-shaped steel A having the layer thickness of 1.0 mm was used as the material 1 and the plate-shaped steel C having the layer thickness of 1.0 mm was used as the material 2.

Then, in the process of rolling the multilayered steel, unlike the example 1 in Table 3, the cold cooling only was used. Here, a plurality of times of the cold rolling was performed and, in one time of the cold rolling, rolling was performed at the maximum draft of 50% to produce the multilayered rolled steel.

Then, the heat treatment was performed on the multilayered rolled steel by heating at temperature 1000° C. for about 2 minutes and then a cooling process by water-cooling was performed to produce the multilayered steel of the example 2 (demonstrative).

When each layer constituting the multilayered steel of the example 2 in Table 3 thus produced was observed or hardness thereof was measured by an optical microscope, it was confirmed that the constitute phase of the material 1 serving as the first layer was martensite and the constitute phase of the material 2 serving as the second layer was austenite.

Then, when strength and ductility of the multilayered steel of the example 2 in Table 3 were measured, it was confirmed that the strength was 1030 MPa and elongation was 27%. It was also confirmed by the results from the measurement of strength and ductility and by the verification shown in FIG. 2 that the multilayered steel was capable of achieving compatibility of its properties which are incompatible with each other such as in the case of high strength and high ductility and which was excellent in strength, ductility, weldability, toughness, and fatigue strength.

On the other hand, in the comparative example 1 in Table 3 in which only the temperature condition for the heat treatment was different from that in the example 2 in Table 3 and the temperature of the heat treatment is lowered to 800° C., though the constituent phase of the layer of the material 1 was martensite and the constituent phase of the layer of the material 2 was austenite, the ductility was lowered to 6%. That is, the verification in FIG. 2 shows that the steel of the comparative example 1 in Table 3 cannot achieve compatibility in properties being incompatible with each other.

From this verification, it was confirmed that the lowering of temperature conditions for heat treatment caused the degradation in ductility. The elongation (that is, ductility) of the steel having the same configurations as in the above example 2 or in the comparative example 1 was measured by changing only the temperature conditions in the heat treatment.

Figure 9:
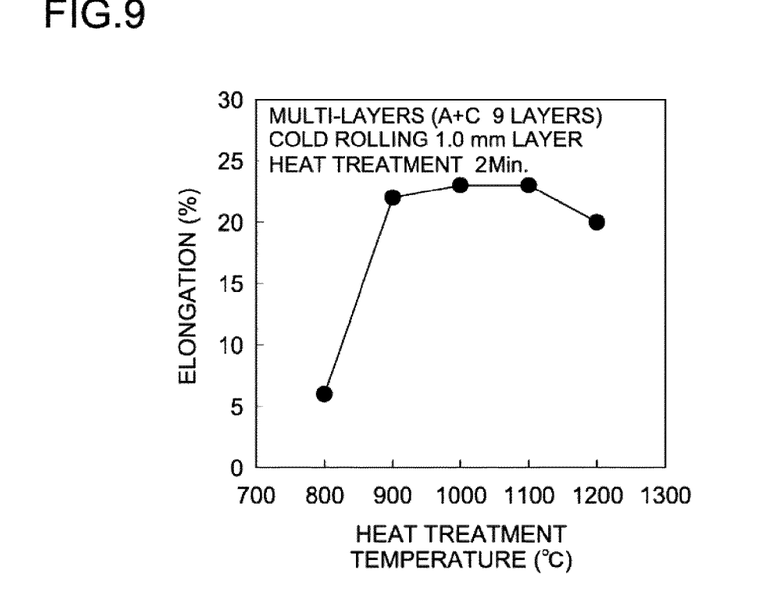
FIG. 9 is a graph showing a relation between heat treatment temperature and elongation.

From the above, results as shown in FIG. 9 were obtained and, when the heat treatment was performed at 900° C. above 800° C., the ductility became 22%.

Therefore, it was confirmed that it was necessary that the temperature to be used for the heat treatment was the temperature that improved the ductility and the temperature in the range between 900° C. and 1250° C. was preferable.

Also, in the example 9 in Table 3, the plate-shaped steel B1 having the layer thickness of 1.2 mm was used as the material 1. The plate-shaped steel C having the layer thickness of 1.0 mm was used as the material 2.

Then, the multilayered steel was produced in which the material 1 was used as an even-numbered layer and the material 2 was used as an odd-numbered layer and 11 pieces of layers were stacked sequentially and alternately and the material 2 was disposed on both the outer surfaces thereof.

Then, in the process of rolling the multilayered steel, the cold cooling only was used. In one time of the cold rolling in a plurality of times of the cold rolling, rolling was performed, at the maximum draft of 40%, on the multilayered steel to produce the multilayered rolled steel.

After that, after the heat treatment was performed on the multilayered rolled steel by heating at temperature 1000° C. for about 2 minutes, a cooling process by water-cooling was performed to produce the multilayered steel.

The thickness per one layer constituting the multilayered steel of the example 9 in Table 3 was 1.0 mm in a finish thickness including the thickness of each layer being 1.0 μm.

When each layer of the multilayered steel of the example 9 in Table 3 produced as above was observed or hardness of the layer was measured by an optical microscope, it was confirmed that the constitute phase of the material 1 was martensite and the constitute phase of the material 2 was austenite.

Next, when strength and ductility of the multilayered steel of the example 9 in Table 3 were measured, it was confirmed that the strength was 1090 MPa and ductility was 27%.

Thus, it was confirmed that, in the example 9 in Table 3, when the results from the measurement of strength and elongation were verified based on the data in FIG. 2, the multilayered steel was able to be obtained which was able to achieve compatibility in properties which were incompatible with each other such as in the case of strength and ductility and which was excellent in strength, ductility, weldability, toughness, and fatigue strength.

On the other hand, in the case of the comparative example 2 in Table 3 in which the maximum draft in a pass for the cold rolling was different from that of the example 9 in Table 3 and the maximum draft obtained in the cold rolling in one time of a plurality of times of the cold rolling was lowered to 20% and, although the constitute phase of the layer of the material 1 was martensite and the constituent phase of the layer of the material 2 was austenite, the strength lowered to 950 MPa and ductility lowered to 6%.

It was confirmed from the above that, when the maximum draft (called a "maximum pass draft) in the cold rolling was lowered, the strength and ductility were also lowered. Here, elongation (that is, ductility) of the steel having the same microstructure as in the example 9 in Table 3 or in the comparative example 2 in Table 3 was measured by changing only the maximum pass draft in the cold rolling.

Figure 10:
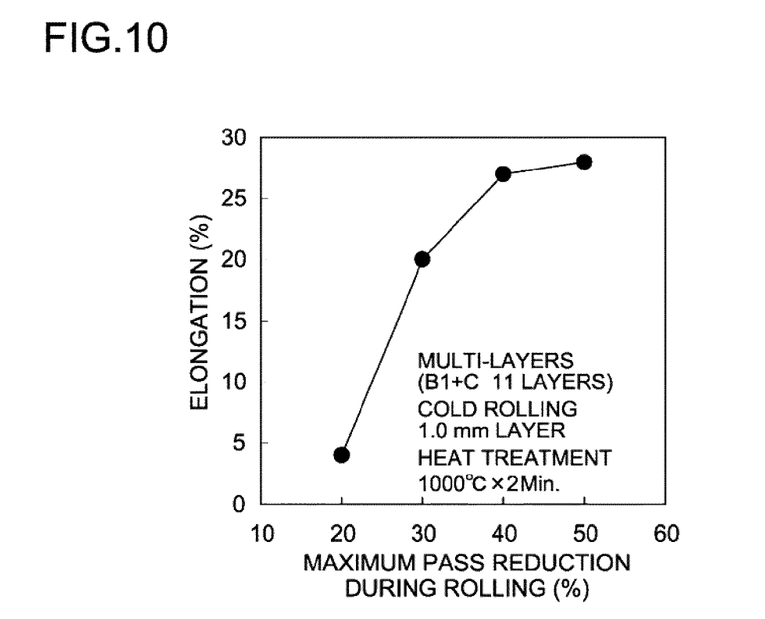
FIG. 10 is a graph showing a relation between a maximum pass reduction during rolling and the ductility of the multilayered steel.

By the above measurement, such results as shown in FIG. 10 were obtained and, when the maximum draft in pass was raised up to 20% or more, for example, up to about 30%, and the ductility was 20%.

Therefore, it was confirmed that the maximum draft in pass in the cold rolling had to be the draft that could improve the ductility and that, more specifically, the draft of about 30% was preferable.

Moreover, in the example 12 in Table 3, the plate-shaped steel B having the layer thickness of 1.2 mm was used as the material 1. The plate-like steel G having the layer thickness of 1.0 mm was used as the material 2.

By using the material 1 as the even-numbered layers and using the material 2 as the odd-numbered layers and by stacking 11 pieces of the layers in total sequentially and alternately and by disposing the material 2 on both the outer surfaces thereof, the multilayered steel was produced.

Next, in the process of rolling the multilayered steel, only the cold rolling was performed and, by rolling the multilayered steel at the maximum draft in pass being 50% in the cold rolling in one time out of a plurality of times of the cold rolling, the multilayered rolled steel was produced.

After that, the multilayered rolled steel was heated as the thermal process at 100° C. for about 2 minutes and then was water-cooled to produce the multilayered steel of the example 2 in Table 3.

In the case of the multilayered steel of the example 12 in Table 3, its finish thickness was 0.8 mm including the thickness of each layer of 73 μm.

When each of the layers constituting the multilayered steel of the example 12 in Table 3 produced as above was observed by the optical microscope or the hardness thereof were measured, it could be confirmed that the constitute phase of the material 1 was martensite and the constitute phase 2 was ferrite.

Next, the measurement of strength and ductility of the multilayered steel of the example 12 was performed, through which it was confirmed that the strength was 1040 MPa and the ductility was 27%.

Thus, in the example 12, it was confirmed by the results from the measurement of strength and ductility and by the verification shown in FIG. 2 that the multilayered steel being capable of making its originally mutually incompatible properties such as high strength and high ductility compatible with each other, being excellent in strength, ductility, weldability, toughness, and fatigue strength was able to be obtained.

On the other hand, in the comparative example 3 in which the cooling method to be performed after the heat treatment was different from the example 12, that is, a mild cooling method was employed instead of water-cooling, the constituent phase of the layer of the material 2 became ferrite, yet the constituent phase of the layer of the material 1 also became ferrite and its strength was lowered to 710 MPa and its ductility was lowered to 19%.

This confirmed that, when the mild cooling was performed after the heat treatment, the constitute phase of the layer of the material 1 was not martensite and its strength was lowered.

Therefore, it was also confirmed from the results described above and the items of the heat treatment of other examples in Table 3 that water-cooling or air-cooling was preferable as a cooling method after the heat treatment.

Thus, in any of the examples 1 to 6 in Table 3, it was confirmed by the results from the measurement of strength and ductility and by the verification shown in FIG. 2 that there could be obtained the multilayered steel being capable of making its originally mutually incompatible properties such as high strength and high ductility compatible with each other, and being excellent in strength, ductility, weldability, toughness, and fatigue strength.

The invention claimed is:

1. A multilayered steel comprising:
   a plate-shaped first layer serving as an even-numbered layer and comprising, by mass %, at least 0.05 to 0.4 C, 0.05 to 3.0 Si, 0.05 to 3.0 Mn and unavoidable impurities; and
   a plate-shaped second layer serving as an odd-numbered layer and comprising at least one of a steel C comprising at least, by mass %, 0.01 to 0.15 C, 0.01 to 1.0 Si, 0.01 to 2.0 Mn, 12.0 to 24.0 Cr, 4.0 to 14.0 Ni, and 0.001 to 0.3 N, and unavoidable impurities and a steel E comprising at least, by mass %, 0.001 to 0.15 C, 0.05 to 3.0 Si, 15.0 to 32.0 Mn and unavoidable impurities,
   wherein the first layer and the second layer are sequentially and alternately stacked in an odd number of layers such that the first layer is sandwiched between the second layers, thus obtaining a multilayered steel material having at least five layers with the second layers disposed on outer surfaces thereof, the multilayered steel material being rolled and treated with heat, and
   wherein the first layer has martensite phase having high strength and low ductility as a main phase, and the second layer has at least one of austenite and ferrite phases having low strength and high ductility as a main phase.

2. The multilayered steel according to claim 1, wherein the first layer further comprising:
   one or more elements out of 0.001 to 0.1 mass % of Nb, 0.001 to 0.1 mass % of Ti, 0.001 to 0.5 mass % of V, 0.01 to 16.0 mass % of Cr, 0.01 to 12.0 mass % of Ni, 0.01 to 3.0 mass % of Mo, and 0.01 to 1.0 mass of Cu;
   the steel C further comprising one or more elements out of 0.001 to 0.1 mass % of Nb, 0.001 to 0.1 mass % of Ti, 0.001 to 0.5 mass % of V, 0.01 to 3.0 mass % of Mo, and 0.01 to 1.0 mass % of Cu; and
   the steel E further comprising one or more elements out of 0.001 to 0.1 mass % of Nb, 0.001 to 0.1 mass % of Ti, 0.001 to 0.5 mass % of V, 0.01 to 12.0 mass % of Cr, 0.01 to 40.0 mass % of Ni, 0.01 to 3.0 mass % of Mo, 0.01 to 1.0 mass % of Cu, and 0.001 to 0.3 mass % of N.

3. The multilayered steel according to claim 1, wherein a thickness of each layer constituting the multilayered steel is equal to or less than 125μm.

4. A method for producing a multilayered steel, comprising the steps of:
   preparing a plate-shaped first layer serving as an even-numbered layer and comprising, at least, by mass %, 0.05 to 0.4 C, 0.05 to 3.0 Si, 0.05 to 3.0 Mn and unavoidable impurities;
   preparing a plate-shaped second layer serving as an odd-numbered layer and comprising at least one of a steel C comprising at least, by mass %, 0.01 to 0.15 C, 0.01 to 1.0 Si, 0.01 to 2.0 Mn, 12.0 to 24.0 Cr, 4.0 to 14.0 Ni, and 0.001 to 0.3 N, and unavoidable impurities, and a steel E comprising at least, by mass %, 0.001 to 0.15 C, 0.05 to 3.0 Si, 15.0 to 32.0 Mn and unavoidable impurities;
   sequentially and alternately stacking the first layer and the second layer in an odd number of layers such that the first layer is sandwiched between the second layers, thus preparing a multilayered steel material having at least five layers with the second layers disposed on outer surfaces thereof; and
   rolling and heat treating the multilayered steel material,
   wherein the first layer has martensite phase having high strength and low ductility as a main phase, and the second layer has at least one of austenite and ferrite phases having low strength and high ductility as a main phase.

5. The method of producing a multilayered steel, according to claim 4,
   wherein the first layer further comprises one or more elements out of 0.001 to 0.1 mass % of Nb, 0.001 to 0.1 mass % of Ti, 0.001 to 0.5 mass % of V, 0.01 to 16.0 mass % of Cr, 0.01 to 12.0 mass % of Ni, 0.01 to 3.0 mass % of Mo, and 0.01 to 1.0 mass of Cu;
   wherein the steel C further comprises one or more elements out of 0.001 to 0.1 mass % of Nb, 0.001 to 0.1 mass % of Ti, 0.001 to 0.5 mass % of V, 0.01 to 3.0 mass % of Mo, and 0.01 to 1.0 mass % of Cu;
   wherein the steel E further comprises one or more elements out of 0.001 to 0.1 mass % of Nb, 0.001 to 0.1 mass % of Ti, 0.001 to 0.5 mass % of V, 0.01 to 12.0 mass % of Cr, and 0.01 to 40.0 mass % of Ni, 0.01 to 3.0 mass % of Mo, 0.01 to 1.0 mass % of Cu, and 0.001 to 0.3 mass % of N.

6. The method for producing a multilayered steel according to claim 4, wherein a thickness of each layer constituting the multilayered steel is equal to or less than 125 μm.

7. The method for producing a multilayered steel according to claim 4, wherein the multilayered steel is formed so that a final thickness of each layer constituting the multilayered steel obtained after rolling becomes less than or equal to one half of its original thickness of each layer before rolling.

8. The method for producing a multilayered steel according to claim 4, wherein the rolling is hot rolling.

9. The method for producing a multilayered steel according to claim 4, wherein the rolling is cold rolling.

10. The method for producing a multilayered steel according to claim 4, wherein the rolling is warm rolling.

11. The method for producing a multilayered steel according to claim 4, wherein the rolling is to be performed by using at least two kinds of the hot rolling, cold rolling, warm rolling in combination.

12. The method for producing a multilayered steel according to claim 4, wherein heat treatment is performed after the rolling.

13. The method for producing a multilayered steel according to claim 10, wherein the warm rolling is performed at temperature range between 200° C. and 750° C.

14. The method for producing a multilayered steel according to claim 9, wherein the cold rolling is performed once or more with a reduction in thickness of 30% or more.

15. The method for producing a multilayered steel according to claim 12, wherein, in the heat treatment, soaking is performed at temperature range between 900° C. and 1250° C. for one or more seconds and, after the heat treatment, the steel is cooled to room temperature.

* * * * *